(12) United States Patent
Yao et al.

(10) Patent No.: US 12,510,522 B2
(45) Date of Patent: Dec. 30, 2025

(54) METHOD FOR DETECTING DTPA CONTENT IN ADC BY LC-MS/MS

(71) Applicant: REMEGEN CO., LTD., Yantai (CN)

(72) Inventors: Xuejing Yao, Yantai (CN); Fangfang Sun, Yantai (CN); Wenlong Sun, Yantai (CN); Guiping Qi, Yantai (CN)

(73) Assignee: REMEGEN CO., LTD., Yantai (CN)

( * ) Notice: Subject to any disclaimer, the term of this patent is extended or adjusted under 35 U.S.C. 154(b) by 170 days.

(21) Appl. No.: 17/795,532

(22) PCT Filed: Mar. 30, 2022

(86) PCT No.: PCT/CN2022/083945
§ 371 (c)(1),
(2) Date: Jul. 26, 2022

(87) PCT Pub. No.: WO2022/206806
PCT Pub. Date: Oct. 6, 2022

(65) Prior Publication Data
US 2024/0183827 A1 Jun. 6, 2024

(30) Foreign Application Priority Data
Mar. 31, 2021 (CN) .......................... 202110349989.7

(51) Int. Cl.
*G01N 30/72* (2006.01)
*B01D 15/10* (2006.01)
*G01N 30/02* (2006.01)
*G01N 30/06* (2006.01)

(52) U.S. Cl.
CPC ......... *G01N 30/7233* (2013.01); *B01D 15/10* (2013.01); *G01N 30/06* (2013.01); *G01N 2030/027* (2013.01)

(58) Field of Classification Search
CPC ........ G01N 30/06; G01N 30/34; G01N 30/50; G01N 30/72; G01N 30/7233; G01N 30/88; G01N 2030/027; B01D 15/10
USPC ............. 436/8, 106, 11, 127, 131, 161, 173; 422/70
See application file for complete search history.

(56) References Cited

U.S. PATENT DOCUMENTS

| | | | |
|---|---|---|---|
| 10,947,316 B2 | 3/2021 | Lee et al. | |
| 2010/0285593 A1 | 11/2010 | Amoura | |
| 2012/0309691 A1 | 12/2012 | Zhou et al. | |
| 2020/0055938 A1 | 2/2020 | Desai et al. | |
| 2024/0201147 A1 * | 6/2024 | Yao ........................ | B01D 15/08 |

FOREIGN PATENT DOCUMENTS

| | | | |
|---|---|---|---|
| CN | 102492017 A | | 6/2012 |
| CN | 103002919 A | | 3/2013 |
| CN | 107167540 A | | 9/2017 |
| CN | 107167541 A | | 9/2017 |
| CN | 107315056 A | | 11/2017 |
| CN | 107340343 A | * | 11/2017 |
| JP | H0321863 A | | 1/1991 |
| JP | 2020518587 A | | 6/2020 |

OTHER PUBLICATIONS

Japanese Patent Office, Office Action Issued in Application No. 2023-557461, Aug. 20, 2024, 8 pages.
Virginia del Solar et al., "Metal-Based Antibody Drug Conjugates. Potential and Challenges in their Application as Targeted Therapies in Cancer#", Journal of Inorganic Biochemistry, Jul. 2019, total 55 pages.
Xingcheng Zhao et al., "Toxicity and pro-discharge applications of DTPA", China Academic Journal Electronic Publishing House, total 5 pages.
Lin Yu et al., "Developing a robust LC-MS/MS method to quantify Zn-DTPA, a zinc chelate in human plasma and urine" Biomedical Chromatography, Oct. 31, 2018, vol. 32, No. 10, total 24 pages.
Japanese Patent Office, Decision of Refusal in Application No. 2023-557461, Feb. 13, 2025, 10 pages.
Huang, J. Z. et al., "Exploitation of the size-exclusion effect of reversed-phase high performance liquid chromatography for the direct analysis of diethylene triamine pentaacetic acid in therapeutic monoclonal antibody formulations", Journal of Chromatography A, 2016, vol. 1455, pp. 140-146.
Wang, G. et al., "Ion-pairing HPLC methods to determine EDTA and DTPA in small-molecule and biologic pharmaceutical formulations", Journal of Pharmaceutical Analysis, 2016, vol.6, No.3, pp. 150-156.
European Patent Office, European Search Report in Application No. 227789880, Feb. 12, 2025, 6 pages.
Li Z. et al., "Development of a Novel EGFR-Targeting Antibody-Drug Conjugate for Pancreatic Cancer Therapy", Targeted Oncology, Jan. 11, 2019 (Jan. 11, 2019), vol. 14, No. 1, pp. 93-105.

* cited by examiner

*Primary Examiner* — Maureen Wallenhorst
(74) *Attorney, Agent, or Firm* — Kilpatrick Townsend & Stockton LLP

(57) ABSTRACT

The present disclosure relates to a method for detecting DTPA content in ADC by LC-MS/MS. The samples are derivatized with $Fe^{3+}$ under a weak alkaline derivatization condition, and a weak alkaline mobile phase is used, without need for addition of ion-pair reagents. This method has the characteristics of high efficiency, high stability and strong durability, and can well make up for the defects of few DTPA detection methods and complicated operations in the prior art.

12 Claims, 2 Drawing Sheets

METHOD FOR DETECTING DTPA CONTENT IN ADC BY LC-MS/MS

CROSS-REFERENCE OF RELATED APPLICATIONS

The present application is the national phase of International Application No. PCT/CN2022/083945, titled "METHOD FOR DETECTING DTPA CONTENT IN ADC BY LC-MS/MS", filed on Mar. 30, 2022, which claims priority to Chinese Patent Application No. CN202110349989.7, titled "METHOD FOR DETECTING DTPA CONTENT IN ADC BY LC-MS/MS", filed on Mar. 31, 2021 with the China National Intellectual Property Administration, which are incorporated herein by reference in their entireties.

FIELD

The present disclosure relates to the technical field of biomedicine, and in particular to a method for detecting DTPA by LC-MS/MS with high accuracy, strong durability, and good repeatability.

BACKGROUND

Diethyltriaminepentaacetic acid (DTPA) is an aminopolycarboxylic acid consisting of a diethylenetriamine backbone with five carboxymethyl groups.

DTPA was widely used in the late 1950s to promote the excretion of radionuclides, and the calcium salts thereof are mainly used at present. The toxic and side effects of DTPA and the related calcium salts thereof mainly include high-dose lethal reactions, liver and kidney injury, intestinal mucosal injury and hematopoietic inhibition (Zhao Xingcheng et al., Toxicity and excretion-promoting application of DTPA, Foreign Medicine (Radiology), 1980 April).

DTPA is currently widely used in the production of ADC products, and is added in the process of monoclonal antibody reduction, and the main purpose is to protect the reduced protein. DTPA can also be used as a linker for antibody drug conjugates (Virginia del Solar et al., Metal-based antibody drug conjugates. Potential and challenges in their application as targeted therapies in cancer, Journal of Inorganic Biochemistry 199, 2019), and used in the preparation of Platinum metal-based antibody drug conjugates. The process practice shows that without the addition of DTPA, ADC cannot be conjugated normally or the quality of the product after conjugation decreases. There is usually no specific removal process for DTPA in the current ADC production process, and it is only removed during the product dialysis process. Therefore, it has the possibility of residual in the ADC products, which has a certain negative impact on the safety of subsequent drug products, and cannot be ignored. At present, no research on DTPA detection in ADC-related products has been found in the prior art.

At present, the DTPA detection methods reported in the literature are mainly concentrated on the food field and textile field. Gas chromatography and high performance liquid chromatography are mainly used, and ion chromatography is also used. However, when detected by gas chromatography. DTPA and its complexes are difficult to volatilize due to the presence of polar carbonyl groups, so they need to be esterified to generate volatile compounds, and the operation is complicated. However, when the HPLC method is used, the detection limit is too high, which is not suitable for the detection of residues. In view of the above reasons, the LC-MSMS method has attracted more and more attention. For example, patent application (CN107315056A) discloses a method for the determination of DTPA-Ca in rat plasma biological samples by LC-MSMS, which achieves excellent chromatographic separation effect and excellent target substance recovery rate. Patent application (CN107167541A) discloses a method for the determination of DTPA-Zn in rat plasma biological samples by LC-MSMS, which also achieves a good separation effect. However, these methods are not suitable for DTPA in antibody-drug conjugate products, because the antibody-drug conjugates, as a mixture of protein biomacromolecules, have a complex system, which seriously interferes with the detection of DTPA.

LC-MS/MS is actually a comprehensive detection technology that combines LC technology with MS-MS technology. LC-MS/MS is a combination of liquid chromatography (LC) and mass spectrometry (MS). Its working principle is: after the sample is injected, it is first carried by the mobile phase into the chromatographic column, and after separation by the chromatographic column, it enters the mass spectrometer for detection. The mass spectrometer performs detection according to the mass-to-charge ratio (m/z) of the analytes. The analytes are converted into gas-phase ions in the ion source and enter the mass spectrometer. In the triple quadrupole, the primary mass spectrometer scans a specific range of ions or allows specific ions to enter the collision cell. In the collision cell, the molecular ions are fragmented by collision, and the daughter ions are formed and enter into the secondary mass spectrometer. The secondary mass spectrometer scans a specific range of ions or allows specific ions to enter the detector. The advantages of LC-MS/MS are very significant, because gas chromatography can only separate volatile and non-decomposable substances, while liquid chromatography greatly broadens the separation range. It can be seen that the combination of LC and MS/MS with high selectivity and high sensitivity can perform real-time analysis of complex samples. Even in the case of difficult separation by LC, as long as the target compounds are scanned with neutral fragments by MS1 and MS2, the target compounds in the mixture can be found and highlighted, which can significantly improve the signal-to-noise ratio.

In the method for detecting DTPA by using LC-MSMS, $Fe^{3+}$ derivatization is mostly used. However, the derivatization conditions thereof are all acidic conditions, and mobile phase needs the addition of ion-pair reagents to realize good separation, and the repeatability of the method is poor and unstable. Therefore, in order to detect DTPA better, quickly and efficiently, we developed a method for detecting DTPA by LC-MS/MS based on weak alkaline derivatization conditions, which effectively solved the difficulties encountered in the detection of DTPA in the prior art. In this application, LC-MSMS detection is used in the detection of DTPA in antibody-drug conjugate products, which has high accuracy, strong durability and good repeatability, and has important application value in the quality control of ADC production.

SUMMARY

The present disclosure uses LC-MS/MS method to detect DTPA in the antibody-drug conjugate product, and $FeCl_3$ is used for the derivatization of samples under a weak alkaline derivatization condition. The derivatization time is short, and the samples are stable within 8 h after derivatization, and a weak basic mobile phase is used simultaneously.

Relatively good chromatographic peaks can be produced in a C18 chromatographic column without need for addition of ion-pair reagents. This method is efficient, stable and durable.

In the first aspect of the present disclosure, it relates to a method for detecting DTPA content in ADC samples using liquid chromatography-tandem mass spectrometry (LC-MS/MS, or LC-MS/MS), and the ADC samples detected are derivatized with $Fe^{3+}$ under a weak basic derivatization condition, and a C18 chromatographic column is used while a weak alkaline mobile phase is used, without need for addition of ion-pair reagents.

Further, the weak alkalinity of the present disclosure refers to $7 \leq pH \leq 8$.

Further, $FeCl_3$ is used for the derivatization with $Fe^{3+}$.

Further, the mobile phase A is an aqueous solution comprising ammonium acetate and ammonium hydroxide; preferably an aqueous solution comprising 0.2% 80-100 mM ammonium acetate (W/V) and 0.01% ammonium hydroxide (W/V); most preferably an aqueous solution comprising 0.2% 100 mM ammonium acetate (W/V) and 0.01% ammonium hydroxide (W/V).

Further, the mobile phase B is an acetonitrile solution comprising ammonium acetate and ammonium hydroxide; preferably an acetonitrile solution comprising 0.2% 80-100 mM ammonium acetate (W/V) and 0.01% ammonium hydroxide (W/V); most preferably an acetonitrile solution comprising 0.2% 100 mM ammonium acetate (W/V) and 0.01% ammonium hydroxide (W/V).

Further, the concentration of the added $FeCl_3$ solution is about 40-60 μg/ml, more preferably 50.0 μg/ml.

The method according to any embodiment of the first aspect of the present disclosure, and the method uses DTPA to prepare standard solution.

Further, the standard solution is preferably a 1.0 μg/ml DTPA solution.

Further, the preparation of the DTPA solution and the preparation of the series solutions for standard curve comprise the following steps:
1) Preparation of DTPA working solution: weighing 5~10 mg of DTPA standard into an EP tube, and dissolving with 1 ml of 0.1% ammonium hydroxide to obtain a mother solution, and then diluting the mother solution stepwise to a DTPA concentration of 1.0 μg/ml;
2) preparation of standard curve series solutions: 1.0 μg/ml DTPA standard solution is diluted with mobile phase A to DTPA standard solutions with a series of concentrations of 500 ng/ml, 400 ng/ml, 200 ng/ml, 100 ng/ml, and 50 ng/ml.

According to the method described in any embodiment of the first aspect of the present disclosure, the liquid chromatograph includes but is not limited to: Agilent® 1200 liquid chromatograph from Agilent USA, Teledyne Isco high pressure preparative liquid chromatograph, and Agilent® HPLC 1260 high performance liquid chromatograph.

According to the method described in any embodiment of the first aspect of the present disclosure, the tandem mass spectrometer includes but is not limited to: API™ 4000 tandem mass spectrometer from AB Sciex USA, Shimadzu triple quadrupole liquid chromatography mass spectrometer, and GBC inductively coupled plasma orthogonal acceleration time-of-flight mass spectrometer Optimass®.

According to the method described in any embodiment of the first aspect of the present disclosure, a C18 chromatographic column is used in the liquid chromatography, including but not limited to: YMC®-C18 chromatographic column, Agilent Extard®-C18 chromatographic column, and Shiseido PAK CR®-18 chromatographic column.

According to the method described in any embodiment of the first aspect of the present disclosure, a C18 chromatographic column is used in the liquid chromatography, including but not limited to: YMC-C18, Agilent Extard-C18, and Shiseido PAK CR-18.

In any embodiment of any aspect of the present disclosure, any technical feature can be applied to the technical feature in other embodiments, as long as they do not contradict. All documents cited in the present disclosure are incorporated herein by reference in entirety, and if the meanings expressed by these documents are inconsistent with the present disclosure, the expression of the present disclosure shall prevail.

DETAILED DESCRIPTION OF EMBODIMENTS

Figure 1:
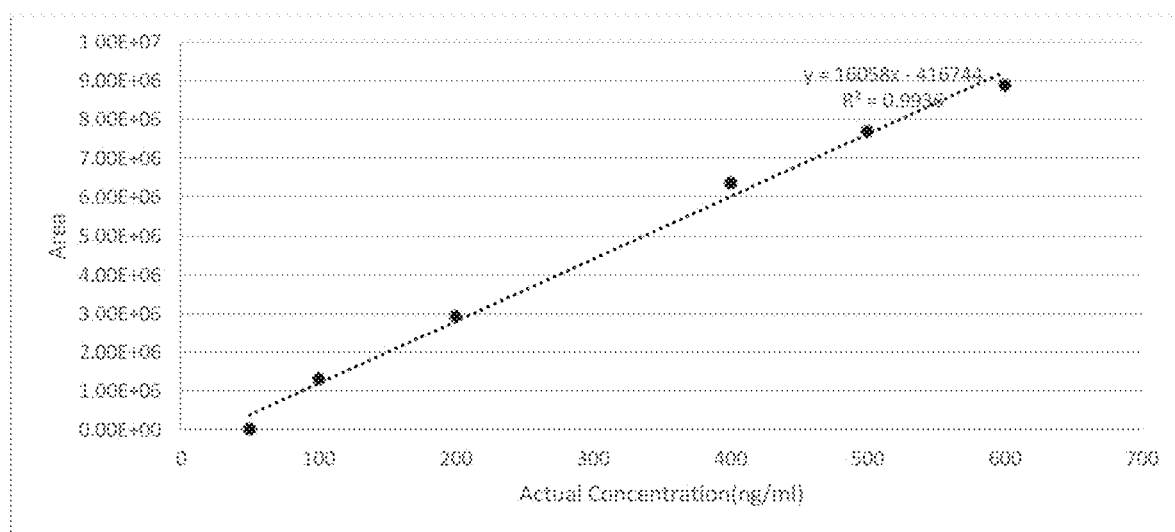
FIG. 1: Linear fitting DTPA standard curve
Figure 2:
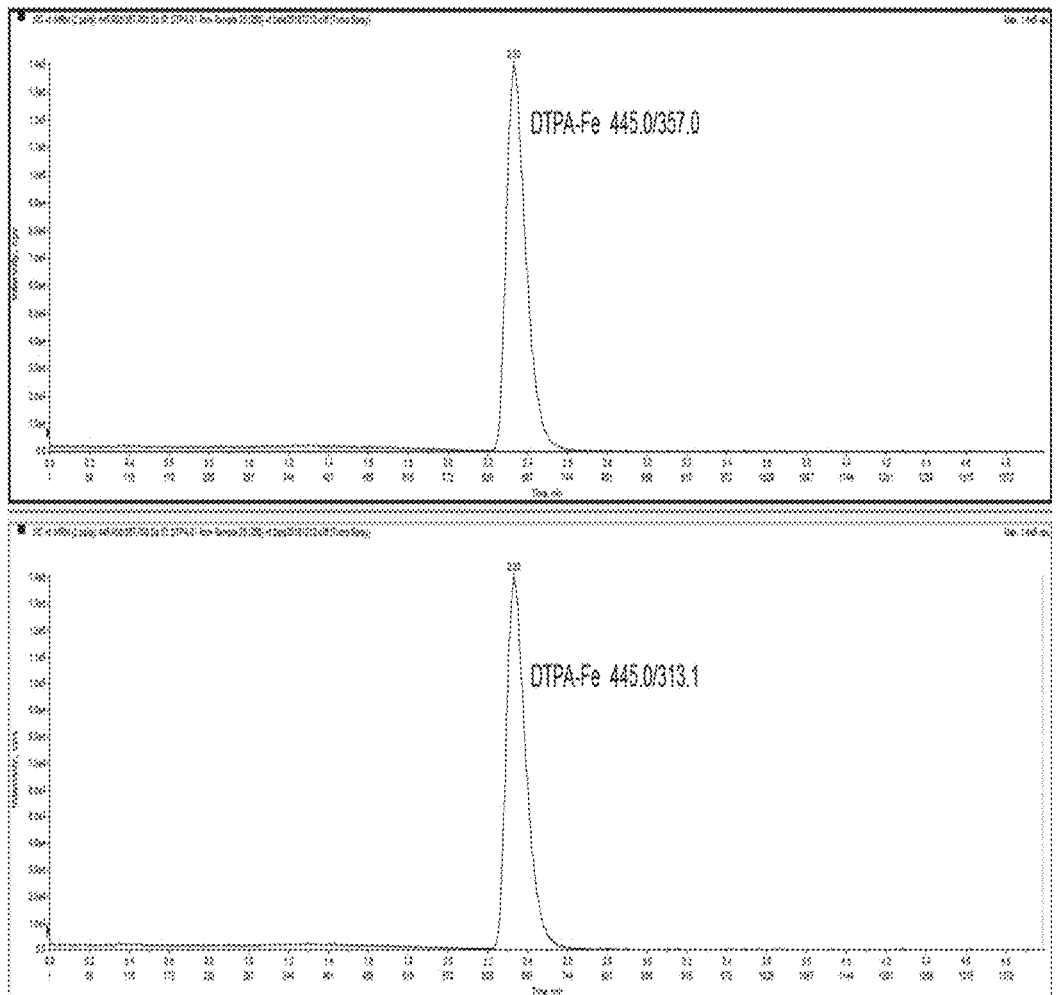
FIG. 2: Determination of DTPA content by LC-MS/MS method

Example 1 Determination of DTPA content by liquid chromatography-tandem mass spectrometry (LC-MS/MS) method
1) Preparation of Working Solution:
Preparation of DTPA working solution: 5-10 mg of DTPA standard was weighed into an EP tube, and dissolved with 1 ml of 0.1% ammonium hydroxide to obtain a mother solution, and then the mother solution was diluted stepwise to a DTPA concentration of 1.0 g/ml.

Preparation of ferric chloride working solution: 10~20 mg of ferric chloride was weighed into an EP tube, and dissolved with an appropriate amount of water to obtain a mother solution, and then the mother solution was diluted stepwise to a ferric chloride concentration of 50.0 μg/ml.

Preparation of series solutions for standard curve: 1.0 μg/ml DTPA (recorded as A1) standard solution was diluted with mobile phase A according to Table 2 to the DTPA standard solutions with a series of concentrations of 600 ng/ml, 400 ng/ml, 200 ng/ml, 100 ng/ml, and 50 ng/ml. 200 μl of the DTPA standard solutions with different concentrations above were taken, and each was added with 5 μl of ferric chloride solution (concentration of 50.0 μg/ml). Then it was directly tested on the machine after mixed by vortex and reacted at room temperature for 9 h in the dark.

TABLE 1

| sample name | working solution name | working solution volume (μl) | diluent volume (μl) | total volume (μl) | final DTPA concentration (ng/ml) |
|---|---|---|---|---|---|
| STD5 | A1 | 600 | 400 | 1000 | 600 |
| STD4 | A1 | 400 | 600 | 1000 | 400 |
| STD3 | STD4 | 500 | 500 | 1000 | 200 |

TABLE 1-continued

| sample name | working solution name | working solution volume (μl) | diluent volume (μl) | total volume (μl) | final DTPA concentration (ng/ml) |
|---|---|---|---|---|---|
| STD2 | STD3 | 500 | 500 | 1000 | 100 |
| STD1 | STD2 | 500 | 500 | 1000 | 50 |

Preparation of quality control solutions: 1.0 μg/ml DTPA (recorded as A1', which needs to be freshly diluted from mother solution) standard solution was diluted with mobile phase A according to Table 2 to DTPA quality control solutions with concentrations of 400 ng/ml (HQC), 200 ng/ml (MQC), and 100 ng/ml (LQC). 200 μl of the DTPA quality control solutions with different concentrations above was taken, and each was added with 5 μl of ferric chloride solution (concentration 50.0 μg/ml). Then it was directly tested on the machine after mixed by vortex and reacted at room temperature for 4 h in the dark.

TABLE 2

| sample name | working solution name | working solution volume (μl) | diluent volume (μl) | total volume (μl) | final DTPA concentration (ng/ml) |
|---|---|---|---|---|---|
| HQC | A1' | 400 | 600 | 1000 | 400 |
| MQC | HQC | 500 | 500 | 1000 | 200 |
| LQC | MQC | 500 | 500 | 1000 | 100 |

2) Determination by Liquid Chromatography-Tandem Mass Spectrometry:

Treatment of the samples to be tested: Mobile phase A (an aqueous solution comprising 0.2% 100 mM ammonium acetate and 0.01% ammonium hydroxide) was used as a diluent to dilute the ADC samples concentration to an appropriate concentration (the DTPA content of samples should be within the linear range, if it exceeds the range then the dilution fold needs to be increased/decreased for the test again). 200 μl of the diluted samples was taken and added with 5 μl of ferric chloride solution (concentration 50.0 μg/ml), and then directly tested on the machine after mixed by vortex and reacted at room temperature for 4 h in the dark.

Preparation of mobile phase A: 0.771 g of ammonium acetate was weighed and dissolved by the addition of 80 ml water with stirring, and water was added to make up to 100 ml, and 100 mM ammonium acetate was obtained after the filtration through a GHP filter membrane. 1000 μl of 100 mM ammonium acetate and 500 μl of 10% ammonium hydroxide were measured precisely, and water was added to the scale of 500 ml, and the mobile phase A was obtained after the filtration through a GHP filter membrane.

Preparation of mobile phase B: 1000 μl of 100 mM ammonium acetate and 500 μl of 10% ammonium hydroxide were measured precisely, and 500 ml of acetonitrile was added, and the mobile phase B was obtained after the filtration through a GHP filter membrane.

During detection, mobile phase A and mobile phase B were used in elution according to the concentration gradient shown in Table 3.

TABLE 3

| | elution time (min) | module | event | parameter |
|---|---|---|---|---|
| elution gradient | 0.0 | Pumps | Pump B ConC | 10 |
| | 2.0 | Pumps | Pump B ConC | 10 |
| | 2.5 | Pumps | Pump B ConC | 50 |
| | 5.0 | Pumps | Pump B ConC | 80 |
| | 5.5 | Pumps | Pump B ConC | 10 |
| | 8.0 | Controller | Stop | / |

3) Data Processing and Analysis

Evaluation standard: Standard curve: r≥0.9800, the recovery rate of the concentration points of the upper limit of quantification and lower limit of quantification is within 80.0%-120.0%.

The recovery rate of the quality control is within 80.0%-120.0%. At least 50% of the quality control samples of each concentration should meet this range, and at least 4 quality control concentration points in the same analysis batch should meet the requirements.

The specific results were as follows:

TABLE 4

Standard curve (see FIG. 1 for the specific fitting curve)

| sample name | sample type | actual concentration (ng/ml) | peak area | retention time | calculated concentration (ng/ml) | accuracy |
|---|---|---|---|---|---|---|
| STD1 | Standard | 50 | 2.16E+04 | 2.57 | 45.481 | 90.96 |
| STD2 | Standard | 100 | 1.32E+06 | 2.56 | 118.126 | 118.13 |
| STD3 | Standard | 200 | 2.94E+06 | 2.57 | 209.537 | 104.77 |
| STD4 | Standard | 400 | 6.36E+06 | 2.58 | 401.707 | 100.43 |
| STD5 | Standard | 500 | 7.69E+06 | 2.58 | 476.081 | 95.22 |

TABLE 4-continued

Standard curve (see FIG. 1 for the specific fitting curve)

| sample name | sample type | actual concentration (ng/ml) | peak area | retention time | calculated concentration (ng/ml) | accuracy |
|---|---|---|---|---|---|---|
| STD6 | Standard | 600 | 8.88E+06 | 2.58 | 543.008 | 90.5 |
| LQC | QC | 100 | 1.200e6 | 2.58 | 111.701 | 111.70 |
| MQC | QC | 200 | 2.865e6 | 2.58 | 205.222 | 102.61 |
| HQC | QC | 400 | 5.924e6 | 2.59 | 377.034 | 94.26 |

The standard curve obtained after linear fitting is as follows:
Y=16058x−416744 R²=0.9936 According to the results shown in FIG. 1, $R^2>0.99$, the fitting were relatively good.

Example 2. Detection Method Results and Evaluation

1) Durability (Stability)

Durability of derivatization temperature: 200 μl of DTPA standard solution with a concentration of 600 ng/ml was taken and added with 5 μl of ferric chloride solution (concentration 50.0 ng/ml), and mixed by vortex and reacted in the dark for 4 hours. The derivatization temperatures were room temperature, 37° C., and 50° C., respectively, and the influence of the derivatization temperature on the results was investigated. The specific results are shown in Table 5.

TABLE 5

| theoretical concentration of sample (ng/ml) | concentration of sample derivatized at 37° C. (ng/ml) | concentration of sample derivatized at room temperature (ng/ml) | concentration of sample derivatized at 50° C. (ng/ml) | RSD (%) |
|---|---|---|---|---|
| 50 | 59.827 | 46.434 | 71.934 | 21.5 |
| 100 | 104.847 | 117.73 | 107.631 | 6.2 |
| 200 | 213.285 | 192.906 | 190.428 | 6.3 |
| 400 | 375.96 | 386.096 | 449.338 | 9.9 |
| 500 | 444.249 | 465.884 | 411.396 | 6.3 |
| 600 | 579.645 | 619.491 | 657.508 | 6.3 |

Durability of derivatization time: 200 μl of DTPA standard solution with a concentration of 600 ng/ml was taken and added with 5 μl of ferric chloride solution (concentration 50.0 μg/ml), and mixed by vortex and reacted in the dark at room temperature. 4 hours, 6 hours, and 8 hours were used respectively to investigate the influence of the derivatization time on the results. The specific results are shown in Table 6.

TABLE 6

| theoretical concentration of sample (ng/ml) | concentration of sample derivatized for 4 h (ng/ml) | concentration of sample derivatized for 6 h (ng/ml) | concentration of sample derivatized for 8 h (ng/ml) | RSD (%) |
|---|---|---|---|---|
| 50 | 46.434 | 51.557 | 45.159 | 7.1 |
| 100 | 117.73 | 101.666 | 93.884 | 11.6 |
| 200 | 192.906 | 139.134 | 132.229 | 21.5 |
| 400 | 386.096 | 329.076 | 290.415 | 14.4 |
| 500 | 465.884 | 458.652 | 489.751 | 3.5 |
| 600 | 619.491 | 666.944 | 700.338 | 6.15 |

The stability of the tested solutions (samples for precision test), i.e., the content change of standard DTPA at 0 hours, 4 hours, and 8 hours after the derivatization reaction of DTPA and ferric chloride was investigated. The specific results are shown in Table 7.

TABLE 7

| theoretical concentration of sample (ng/ml) | concentration of sample at 0 h (ng/ml) | concentration of sample at 4 h (ng/ml) | concentration of sample at 8 h (ng/ml) | RSD (%) |
|---|---|---|---|---|
| 50 | 52.775 | 56.24 | 58.383 | 5.1 |
| 200 | 195.657 | 170.057 | 180.946 | 7.1 |
| 400 | 342.436 | 338.507 | 337.147 | 0.8 |
| 600 | 734.414 | 640.083 | 642.08 | 8.0 |

Evaluation standard: Concentration (relative standard deviation RSD %)≤25.0%. According to the experimental results in Tables 5-7, the RSD % is less than 25.0%, so the method has strong durability.

2) Repeatability

After the instrument was stabilized, the standard 3 solution (DTPA concentration of 200 ng/ml) was taken and derivatized according to the experimental method, and injected for analysis. The results of 6 samples tested were evaluated, and the results were shown in Table 8. The chromatograms were collected, and the RSD of the main peak content was calculated.

TABLE 8

| number of injections | peak area (EU) | concentration (ng/ml) |
|---|---|---|
| 1 | 1.37E+05 | 213.430 |
| 2 | 1.15E+05 | 177.924 |
| 3 | 1.40E+05 | 218.562 |
| 4 | 1.42E+05 | 220.844 |
| 5 | 1.45E+05 | 225.477 |
| 6 | 1.45E+05 | 226.486 |
| RSD | 8.3% | 8.5% |

In the field of quantitative analysis, repeatability refers to the precision of the results obtained by the same analyst within a short interval under the same operating conditions. The acceptable standard for repeatability is: the main peak concentration RSD≤15.0%, this test RSD<15.0%, and the RSD of this method is much smaller than the highest ratio, and the repeatability is good.

The spirit of the present disclosure has been described in detail above through the preferred examples of the present disclosure. Any changes, equivalent changes and modifications made to the above embodiments according to the technical essence of the present disclosure all fall within the protection scope of the present disclosure.

The invention claimed is:

1. A method for detecting DTPA content in ADC (antibody-drug conjugate) by liquid chromatography-tandem mass spectrometry (LC-MS/MS) comprising steps of:
    derivatizing an ADC sample containing DTPA (diethyltriaminepentaacetic acid) with $Fe^{3+}$ under a weak basic derivatization condition of 7≤pH≤8 to form a derivatized sample,
    performing liquid chromatography on the derivatized sample by passing the derivatized sample through a C18 chromatographic column,
    separating DTPA from the derivatized sample by eluting DTPA from the column with a weak alkaline mobile phase of 7≤pH≤8, and
    performing tandem mass spectrometry on the sepatated DTPA in order to detect the content of DTPA in the ADC sample, wherein ion-pair reagents are not added to the ADC sample in the method.

2. The method according to claim 1, wherein $FeCl_3$ is used for the derivatization with $Fe^{3+}$.

3. The method according to claim 2, wherein the weak alkaline mobile phase comprises mobile phase A, and the mobile phase A is an aqueous solution comprising ammonium acetate and ammonium hydroxide.

4. The method according to claim 3, wherein the weak alkaline mobile phase comprises mobile phase B, and the mobile phase B is an acetonitrile solution comprising ammonium acetate and ammonium hydroxide.

5. The method according to claim 4, wherein $FeCl_3$ is in the form of a $FeCl_3$ solution, which has a concentration of about 40-60 μg/ml.

6. The method according to claim 5, wherein the method comprises using DTPA to prepare standard solution before derivatizing the ADC sample.

7. The method according to claim 6, wherein the standard solution is a DTPA solution of 1.0 μg/ml.

8. The method according to claim 7, wherein preparation of the DTPA solution and preparation of series solutions for standard curve comprise the following steps:
    1) Preparation of DTPA standard solution: weighing 5~10 mg of DTPA standard into an Eppendorf® tube, and dissolving with 1 ml of 0.1% ammonium hydroxide to obtain a mother solution, and then diluting the mother solution stepwise to a DTPA concentration of 1.0 μg/ml;
    2) Preparation of standard curve series solutions: 1.0 μg/ml DTPA standard solution is diluted with mobile phase A to DTPA standard solutions with a series of concentrations of 500 ng/ml, 400 ng/ml, 200 ng/ml, 100 ng/ml, and 50 ng/ml.

9. The method according to claim 6, wherein the method further comprises providing quality control solutions before derivatizing the ADC sample, wherein the quality control solutions are prepared by diluting 1.0 μg/ml DTPA solution with mobile phase A, and concentrations of the quality control solutions are 400 ng/ml, 200 ng/ml ml, and 100 ng/ml of DTPA quality control solutions.

10. The method according to claim 1, wherein the liquid chromatography is performed on a liquid chromatograph, which is selected from the group consisting of Agilent® 1200 liquid chromatograph high pressure preparative liquid chromatograph, and Agilent® HPLC 1260 high performance liquid chromatograph.

11. The method according to claim 1, wherein the tandem mass spectrometry is performed on a tandem mass spectrometer, which is selected from the group consisting of API™ 4000 tandem mass spectrometer, triple quadrupole liquid chromatography mass spectrometer, and inductively coupled plasma orthogonal acceleration time-of-flight mass spectrometer Optimass®.

12. The method according to claim 1, wherein the C18 chromatographic column is selected from the group consisting of YMC®-C18, Agilent Extard®-C18, and PAK CR®-18.

* * * * *